(12) United States Patent　　(10) Patent No.:　　US 9,393,724 B2
Olaru　　(45) Date of Patent:　　Jul. 19, 2016

(54) MULTI SHOT INJECTION MOLDING APPARATUS

(71) Applicant: Otto Männer Innovation GmbH, Bahlingen (DE)

(72) Inventor: Gheorghe George Olaru, Freiburg (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 0 days.

(21) Appl. No.: 14/258,008

(22) Filed: Apr. 21, 2014

(65) Prior Publication Data

US 2014/0370142 A1　　Dec. 18, 2014

(30) Foreign Application Priority Data

Apr. 19, 2013　(DE) .......................... 10 2013 006 713

(51) Int. Cl.
*B29C 45/04*　　(2006.01)
*B29C 45/16*　　(2006.01)

(52) U.S. Cl.
CPC ........... *B29C 45/0441* (2013.01); *B29C 45/162* (2013.01); *B29C 2045/0491* (2013.01); *B29C 2045/1685* (2013.01)

(58) Field of Classification Search
CPC　B29C 45/045; B29C 45/0441; B29C 45/162; B29C 45/1618; B29C 45/1625; B29C 45/1628; B29B 2911/14146
USPC ................................................. 425/112, 576
See application file for complete search history.

(56) References Cited

U.S. PATENT DOCUMENTS

| | | | |
|---|---|---|---|
| 3,224,043 A * | 12/1965 | Sieben et al. | ................. 425/134 |
| 3,782,874 A | 1/1974 | Hehl | |
| 4,427,359 A | 1/1984 | Fukuoka et al. | |
| 4,836,767 A | 6/1989 | Schad et al. | |
| 5,032,077 A | 7/1991 | Farrell | |
| 5,066,217 A | 11/1991 | Fukuzawa et al. | |
| 5,090,889 A | 2/1992 | Dober et al. | |
| 5,192,557 A | 3/1993 | Hirata et al. | |
| 5,213,822 A | 5/1993 | Koga | |
| 5,281,123 A | 1/1994 | Hoffmann et al. | |
| 5,750,162 A | 5/1998 | Schad et al. | |
| 5,817,345 A * | 10/1998 | Koch et al. | .................... 425/130 |

(Continued)

FOREIGN PATENT DOCUMENTS

BE　DE 102012006579 A1 * 10/2013 ............ B29C 45/162
DE　　　　1215353 A　4/1966

(Continued)

*Primary Examiner* — Robert B Davis
(74) *Attorney, Agent, or Firm* — McAndrews, Held & Malloy, Ltd.

(57) ABSTRACT

A multi shot injection molding apparatus comprising: a stationary machine platen, a first mold plate, a first injection unit connected to a first mold plate for delivering a first molding material to a plurality of first molding cavities, a movable machine frame, a carrier coupled to a movable machine platen, a second mold plate, a second injection unit for delivering a second molding material to a plurality of second molding cavities, a rotary handling unit having a first plurality of rotary handling unit mold cavity portions n and a second plurality of rotary handling unit mold cavity portions, wherein the rotary handling unit is positionable in a first position and is configured to remove the first portions of the molded parts, a first locking mechanism, a second locking mechanism, a processing station and an ejection station.

14 Claims, 19 Drawing Sheets

(56) References Cited

U.S. PATENT DOCUMENTS

| | | | |
|---|---|---|---|
| 5,830,404 A | 11/1998 | Schad et al. | |
| 5,837,301 A | 11/1998 | Arnott et al. | |
| 6,217,818 B1 * | 4/2001 | Collette et al. | 264/513 |
| 6,428,737 B1 | 8/2002 | Collette et al. | |
| 7,150,845 B1 | 12/2006 | Gram | |
| 2004/0180108 A1 | 9/2004 | Wobbe et al. | |
| 2004/0219254 A1 | 11/2004 | Kobayashi et al. | |
| 2005/0095311 A1 | 5/2005 | Nishizawa et al. | |
| 2006/0153947 A1 | 7/2006 | Shakal et al. | |
| 2008/0193586 A1 | 8/2008 | Araujo | |
| 2009/0136610 A1 | 5/2009 | Boucherie | |
| 2009/0169673 A1 | 7/2009 | Wimberger | |
| 2010/0244314 A1 | 9/2010 | Kato et al. | |
| 2010/0276836 A1 | 11/2010 | Armbruster et al. | |
| 2010/0276841 A1 | 11/2010 | Armbruster | |
| 2011/0206796 A1 | 8/2011 | Clark | |
| 2013/0265776 A1 | 10/2013 | Zöllner et al. | |

FOREIGN PATENT DOCUMENTS

| | | |
|---|---|---|
| DE | 4127621 A1 | 2/1993 |
| DE | 4400649 A1 | 7/1995 |
| DE | 10121691 A1 | 11/2002 |
| DE | 102004053573 A1 | 6/2005 |
| EP | 1512512 A2 * | 3/2005 |
| EP | 1782936 B1 | 3/2009 |
| JP | S6149808 | 3/1986 |
| JP | S63135214 A | 6/1988 |
| WO | 03068483 | 8/2003 |
| WO | 2007082394 | 7/2007 |
| WO | 2014195263 A1 | 12/2014 |

* cited by examiner

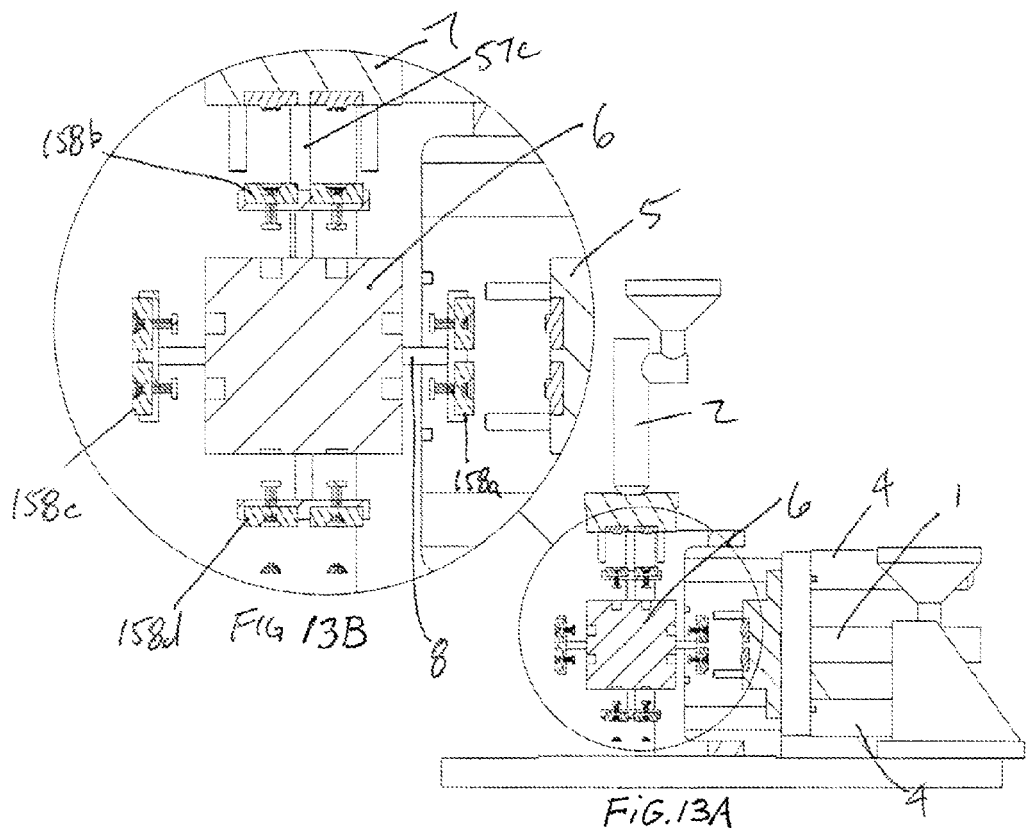
FIG. 13B
FIG. 13A
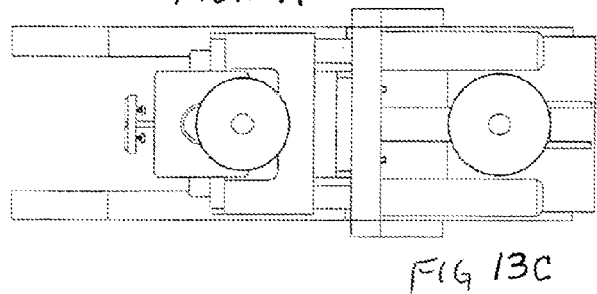
FIG 13C
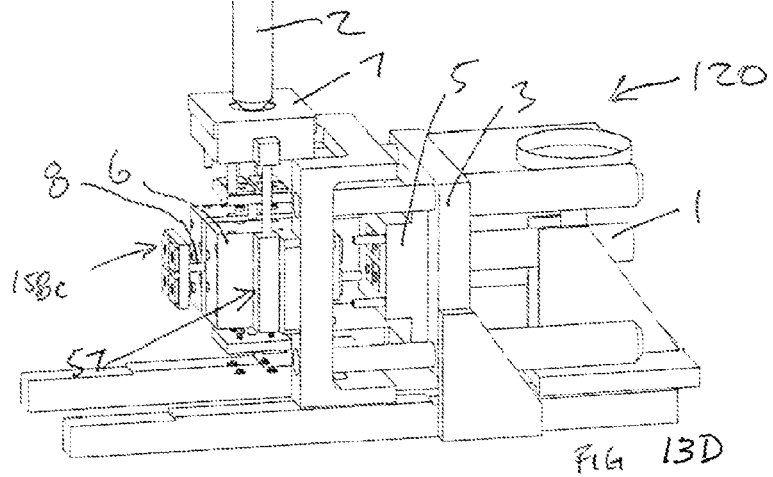
FIG 13D

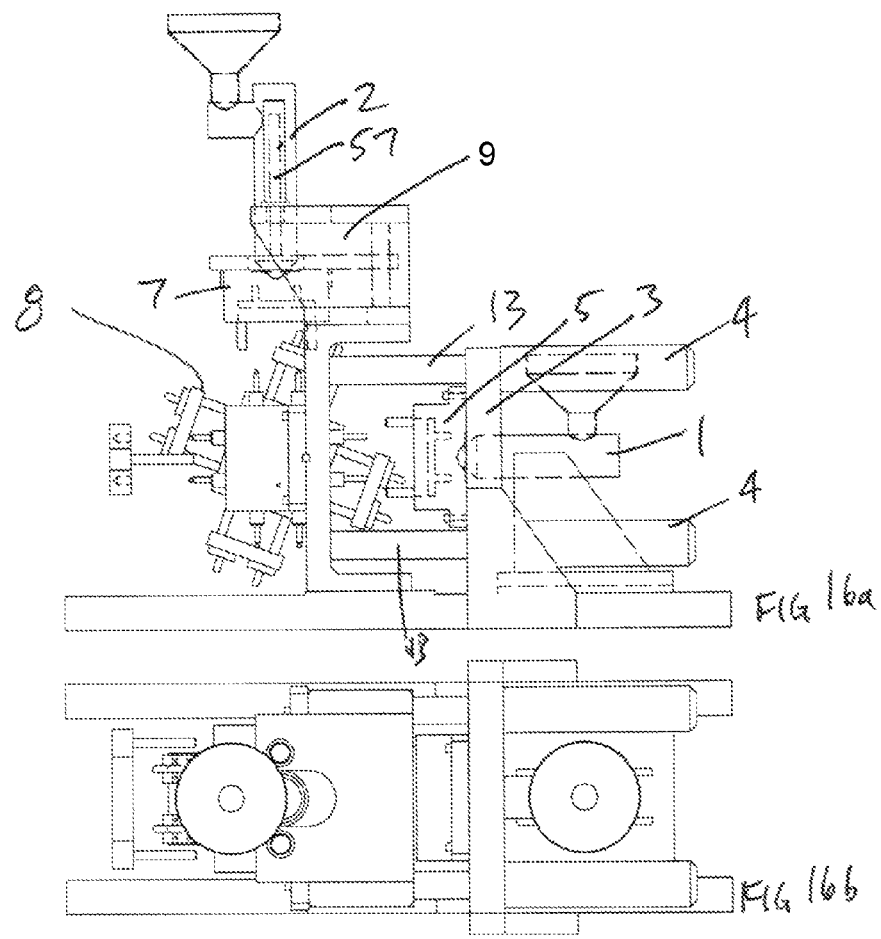
FIG 16a
FIG 16b
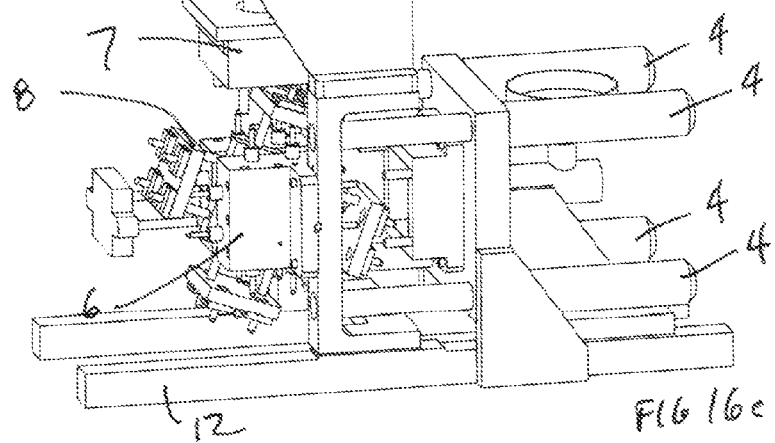
FIG 16c

# MULTI SHOT INJECTION MOLDING APPARATUS

CROSS-REFERENCE TO RELATED APPLICATIONS

This application claims the benefit of German patent application 10 2013 006 713.8 filed Apr. 19, 2013, the contents of all of which are incorporated by reference as if fully set forth in detail herein.

FIELD OF THE INVENTION

This invention is related to an injection molding apparatus and a method of making molded parts in two or more injection steps and in two or more injection molding cavities and a handing system to transport molded parts from one injection station to a subsequent injection station.

BACKGROUND OF THE INVENTION

It is known to form plastic parts in two or more injection steps using the same material or two different materials.

There is a need to further improve the equipment to mold these parts and the methods to mold these parts by simplifying the equipment.

SUMMARY OF THE INVENTION

An injection molding machine has a first injection unit to deliver a first molding material into a first group of mold cavities. A second injection unit coupled to a movable carrier is used to inject a second material into a second group of mold cavities where the second group of mold cavities is formed in a mold attached to the movable carrier. The first and second injection units inject the first and the second materials at the same time.

BRIEF DESCRIPTION OF THE DRAWINGS

FIG. 13A is side view of the FIG. 12A apparatus in an alternative state of operation.

FIG. 13B is an enlarged fragmentary detail view of a portion of FIG. 13A.

FIG. 13C is a top plan view of FIG. 13A.

FIG. 13D is top perspective view of FIG. 13A.

FIG. 16A is side view of the FIG. 14A apparatus in an alternative state of operation.

FIG. 16B is a top plan view of FIG. 16A.

FIG. 16C is top perspective view of FIG. 16A.

DETAILED DESCRIPTION

Figure 6:
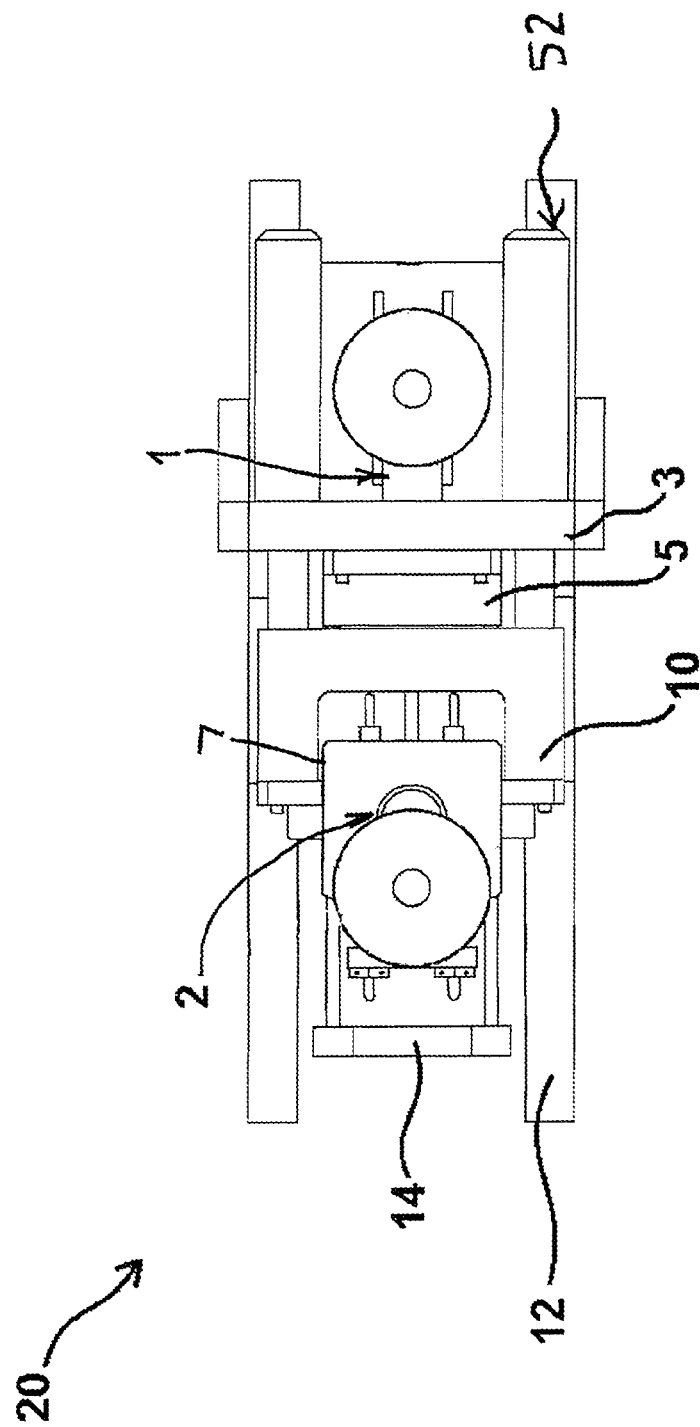
Figure 7:
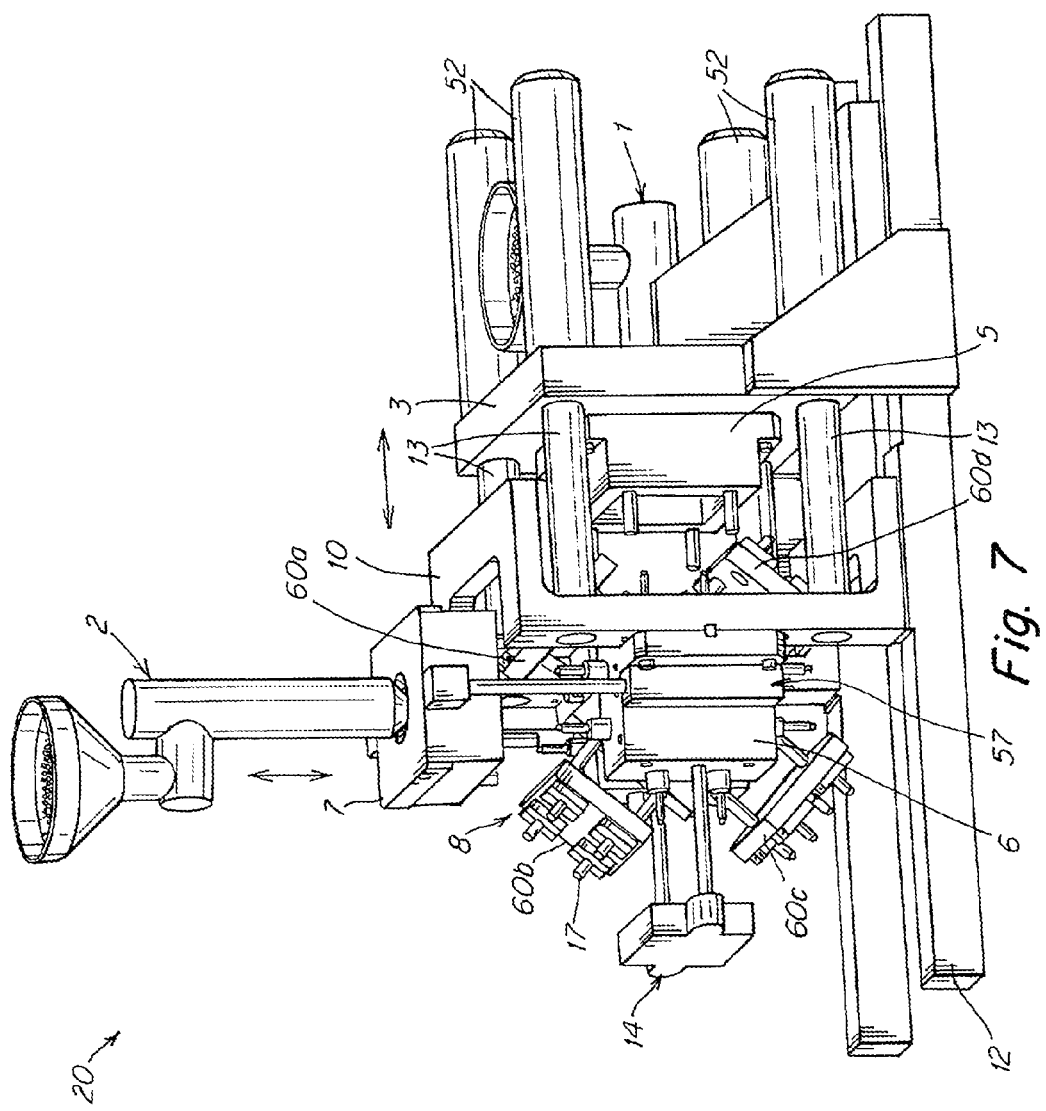
Figure 8:
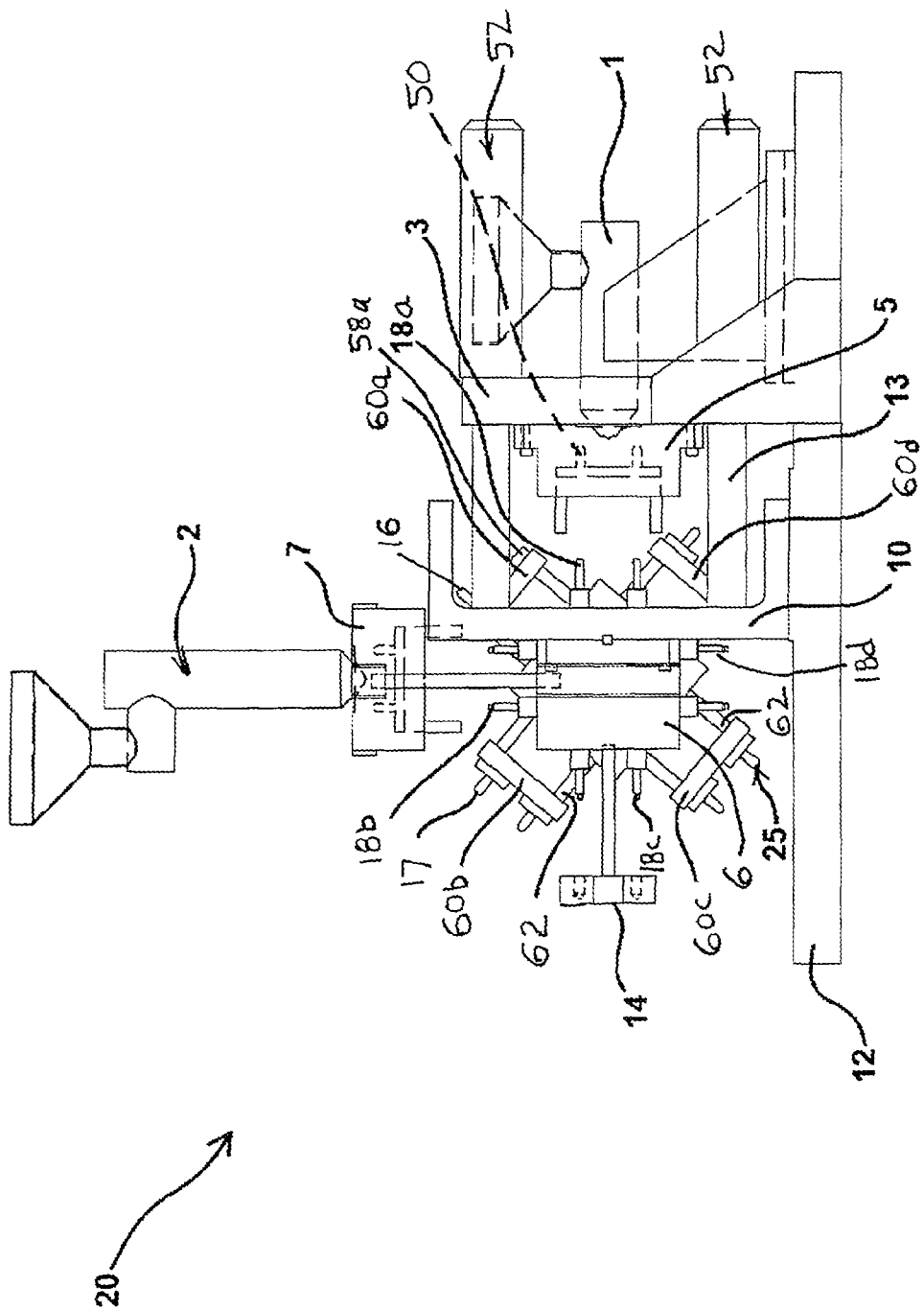

FIGS. 1 to 10 show an injection molding apparatus 20 in accordance with a first embodiment of the present invention, for producing molded parts shown at 25 in FIG. 8. The injection molding apparatus 20 includes a stationary machine platen 3, a first mold plate 5, a first injection unit 1, a movable machine frame 10, a carrier 6, a second mold plate 7, a second injection unit 2, a rotary handling unit 8, a processing station 14 and an ejection station 15. A base 12 is shown supporting the stationary machine platen 3.

Figure 2:
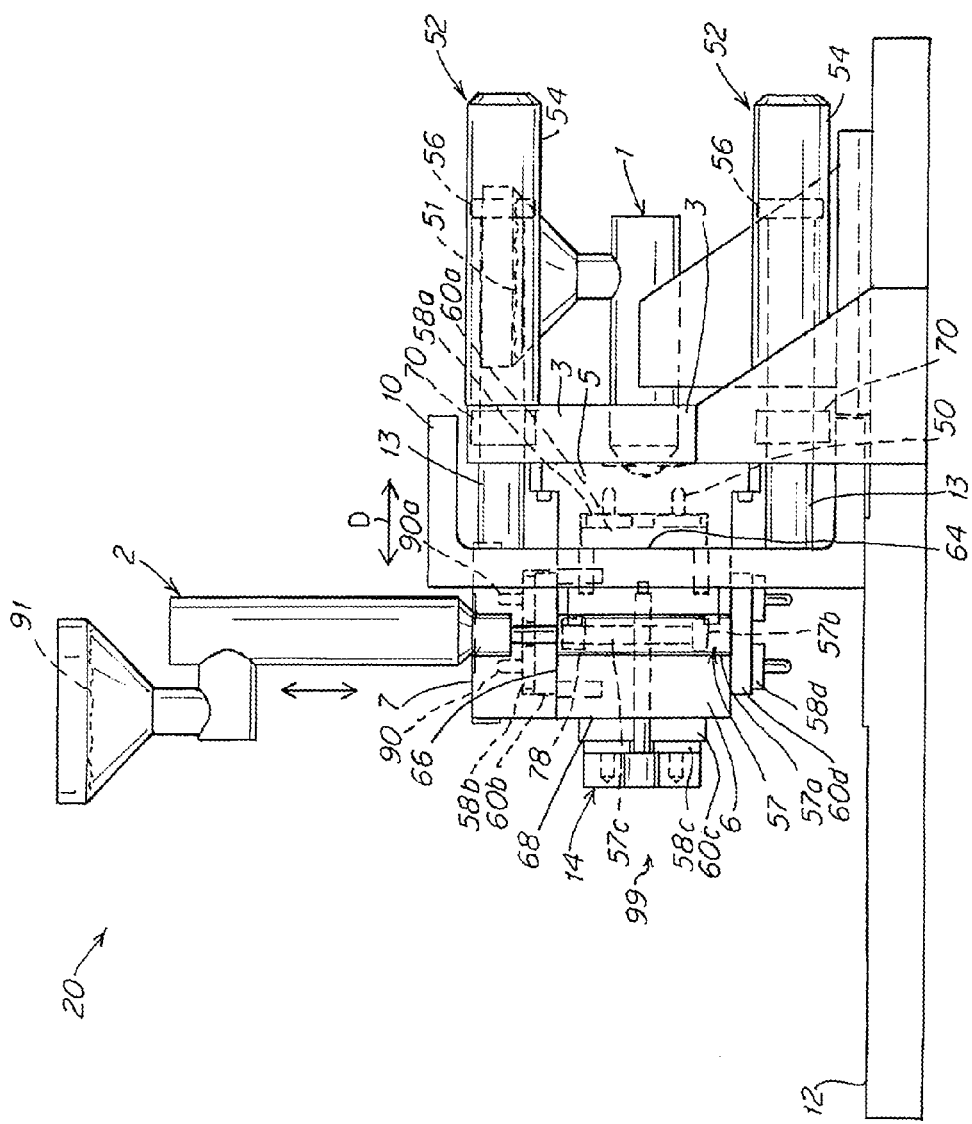

The first mold plate 5 is secured to the stationary machine platen 3. The first injection unit 1 is secured to the stationary machine platen 3 and is sealingly connected to the first mold plate 5 for delivering a first molding material 51 to a plurality of first molding cavities 50 (FIG. 2). The first molding cavities 50 are configured to form first portions 16 (FIG. 5) of the molded parts 25 (FIG. 8). A first portion 50a of each of the first molding cavities 50 is located on the first mold plate 5.

Referring to FIG. 2, the movable machine frame 10 is movable along a first linear direction line (shown at D) relative to the stationary machine platen 3. The carrier 6 is coupled to the movable machine platen or frame 10 for movement along the first direction line D so as to open and close the first molding cavities 50. The carrier 6 is movable between a closed position shown in FIGS. 1-3, and an open position shown in FIGS. 4-9.

The movement of the carrier 6 is carried out by a plurality of first mold plate rams 52, each of which has a housing 54 connected to the stationary machine platen 3, and a piston 56 is movable in the housing 54 by hydraulic pressure, and which connects to a tie bar 13. The tie bars 13 connect to the movable machine frame 10. In the embodiment shown, there are four rams 52.

The second mold plate 7 is positioned in association with the movable machine frame 10. The second injection unit 2 is sealingly connected to the second mold plate 7 for delivering a second molding material 91 to a plurality of second molding cavities 90. A first portion 90a of each of the second molding cavities 90 is located on the second mold plate 7. The second molding cavities 90 are configured to form second portions 17 of the molded parts 25, which are overmolded on the first portions 16. The second injection unit 2 and the second mold plate 7 are moveable together relative to the carrier 6 during the opening and closing of the second mold cavities 90.

The movement of the second mold plate 7 and the carrier 6 is carried out by a plurality of second mold plate rams 57. The second mold plate rams 57 each include a housing 57a and a piston 57b that connects to a tie bar 57c. In the example shown in FIGS. 1-10, the housing 57a connects to the carrier 6 and the tie bar 57c connects to the second mold plate 7.

It will be noted that the carrier 6 itself does not rotate. Instead, the rotary handling unit 8 is rotatably coupled to the carrier 6 and is movable with the carrier 6 along the first direction line D. The rotary handling unit 8 has a first plurality of rotary handling unit mold cavity portions 58a thereon and a second plurality of rotary handling unit mold cavity portions 58b thereon. In the embodiment shown, the rotary handling unit 8 also has third and fourth pluralities of rotary handling unit mold cavity portions shown at 58c and 58d respectively. In the embodiment shown, the rotary handling unit mold cavity portions 58a, 58b, 58c and 58d are positioned on rotary handling unit supports 60a, 60b, 60c and 60d. Each support 60a-60d includes at least one arm 62 that is movable between a retracted position shown in FIG. 2 wherein the associated support 60a-60d is positioned proximate the carrier 6, and an extended position shown in FIG. 5, wherein the associated support 60a-60d is positioned away from the carrier 6. Each arm 62 may form part of a fluid powered ram that is operable to drive the associated support 60a and 60d between the retracted and extended positions.

The rotary handling unit 8 is positionable in a first position (FIG. 2) in which the first plurality of rotary handling unit mold cavity portions 58a are on a first side (shown at 64) of the carrier 6 and cooperate with the first mold plate 5 to at least partially define the first mold cavities 50 and the second plurality of rotary handling unit mold cavity portions 58b are on a second side 66 of the carrier 6 and cooperate with the second mold plate 7 to at least partially define the second mold cavities 90.

The rotary handling unit 8 is configured to remove the first portions 16 of the molded parts 25 from the first side 64 of the carrier 6 and is movable to a second position (shown in FIG. 10) in which the first plurality of rotary handling unit mold cavity portions 58a are on the second side 66 of the carrier 6 and cooperate with the second mold plate 7 to at least partially define the second mold cavities 90.

The processing station 14 is positioned at a third side 68 of the carrier 6, and may carry out any suitable action on the molded parts 25 that come from the second molding cavities 90. For example, the molded parts 25 may be cooled at the processing station 14 (i.e. the processing station 14 may be a cooling station) and may have cooling cores or other cooling devices thereon. The ejection station 15 is the station at which the molded parts 25 are ejected from the injection molding apparatus 20. This may be accomplished by any suitable means, such as by an air blast from within the carrier 6 into the molded parts 25. A suitable conveyor or the like may be positioned beneath the molding apparatus 20 to transport the ejected molded parts 25 from the apparatus 20.

Figure 11A:
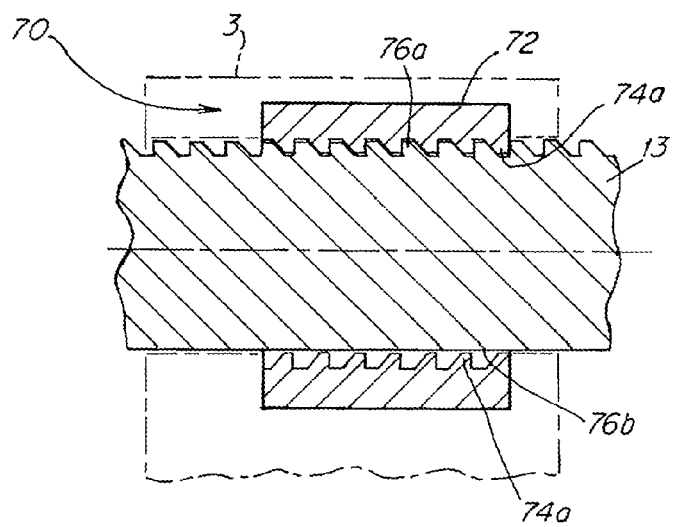
FIG. 11A is a schematic side cross-sectional view of the locking mechanism 70 of the apparatus of FIG. 1 showing both locked (top half) and unlocked (bottom half) states.
Figure 11B:
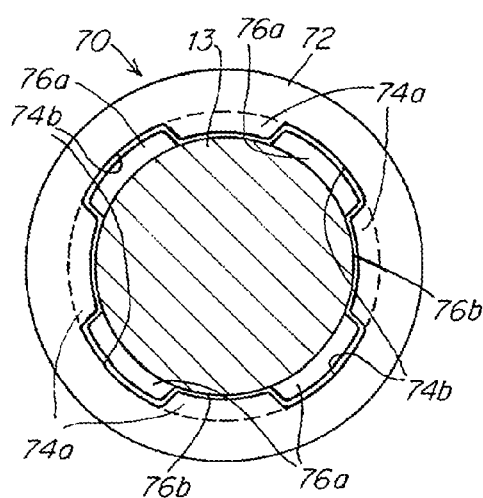
FIG. 11B is a front cross-sectional view of the locking mechanism 70 showing the mechanism in an unlocked state.
Figure 11C:
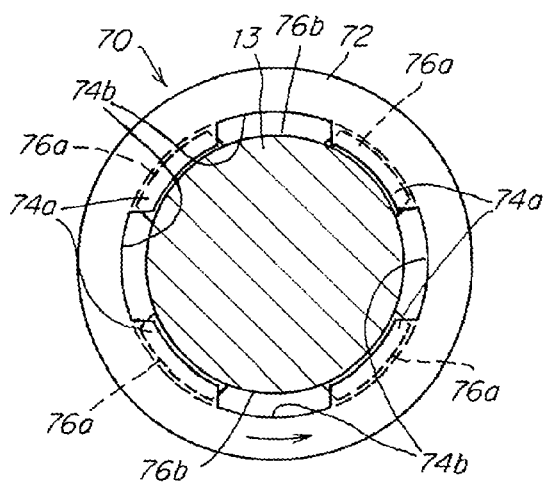
FIG. 11C is a front cross-sectional view of the locking mechanism 70 showing the mechanism in a locked state.
Figure 12A:
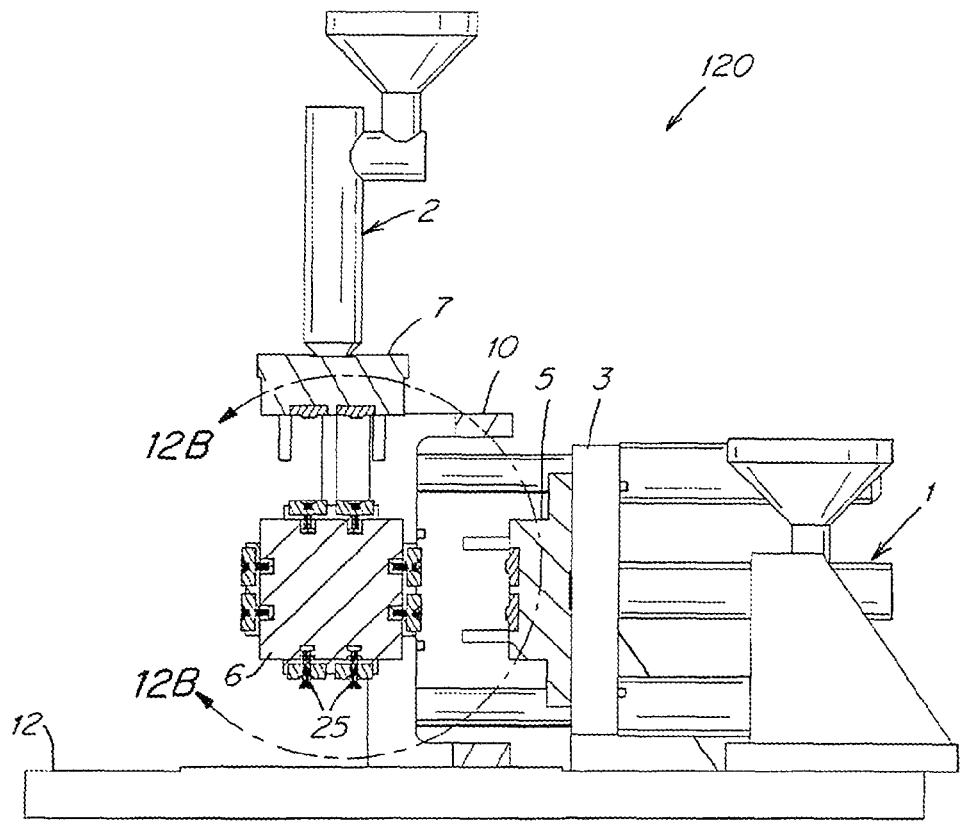
FIG. 12A is side view of another embodiment of the FIG. 5 apparatus at one stage of operation.
Figure 12B:
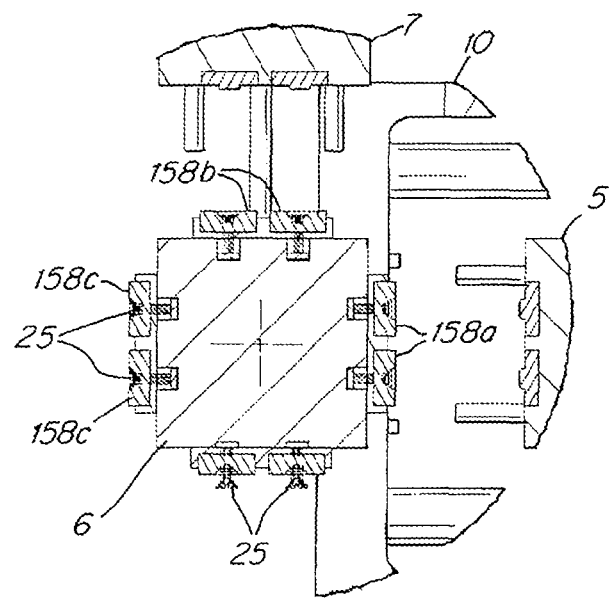
FIG. 12B is an enlarged fragmentary detail view of a portion of FIG. 12A.
Figure 12C:
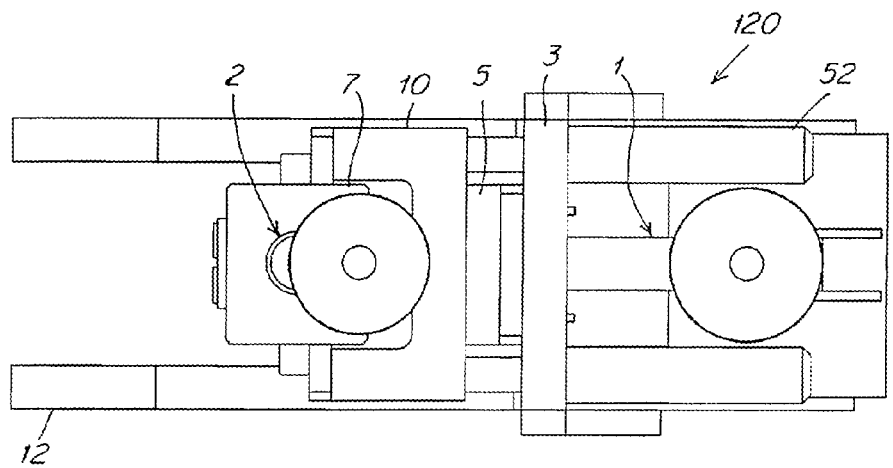
FIG. 12C is a top plan view of FIG. 12A.
Figure 12D:
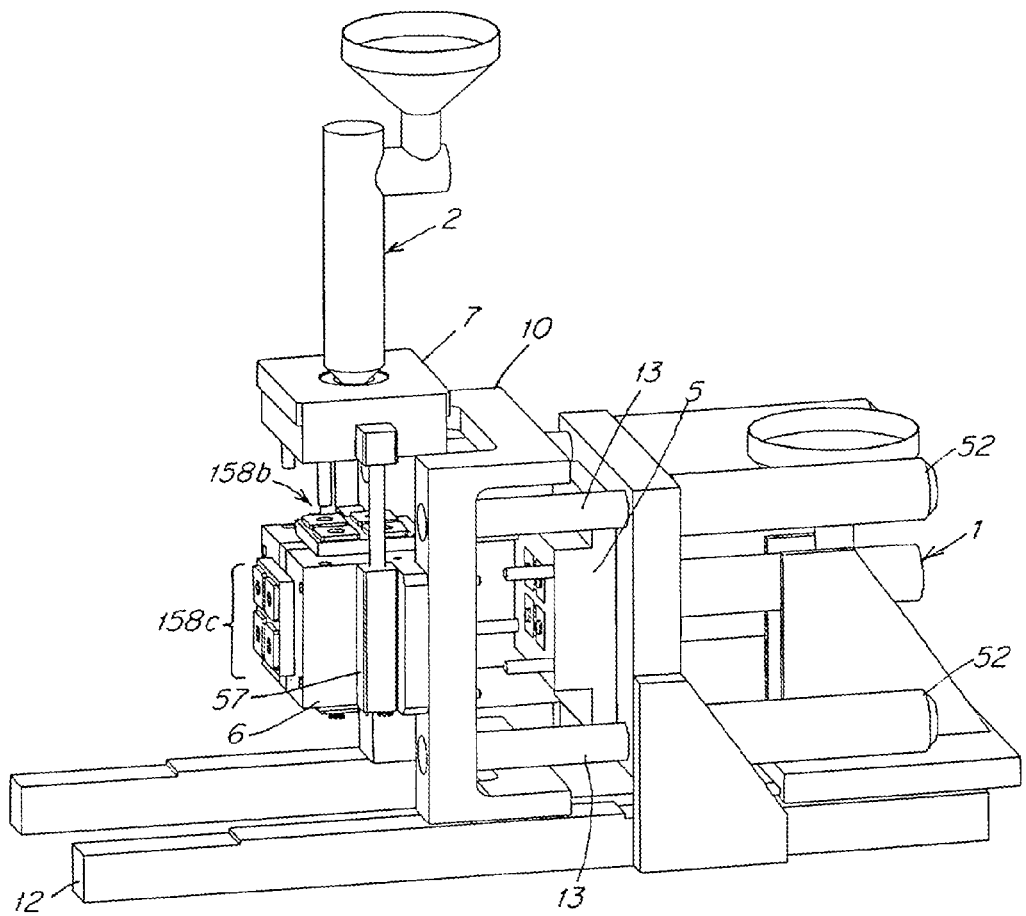
FIG. 12D is top perspective view of FIG. 12A.
Figure 14A:
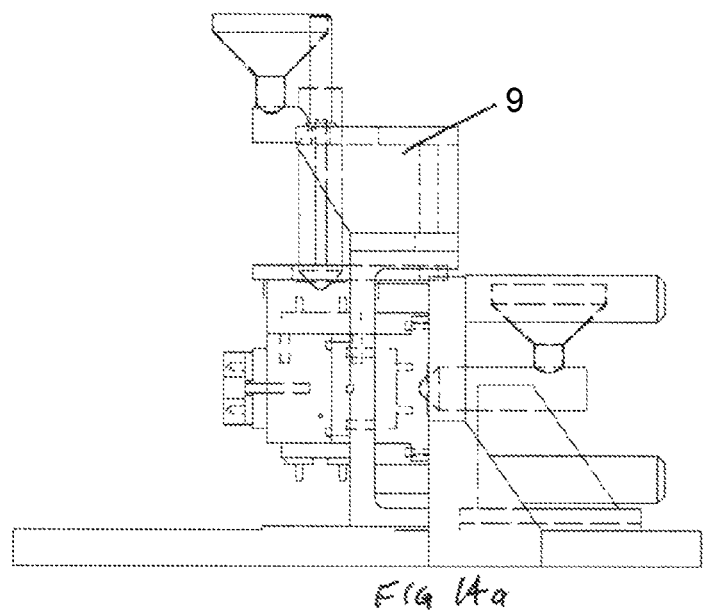
FIG. 14A is side view of another embodiment of the FIG. 1 apparatus.
Figure 14B:
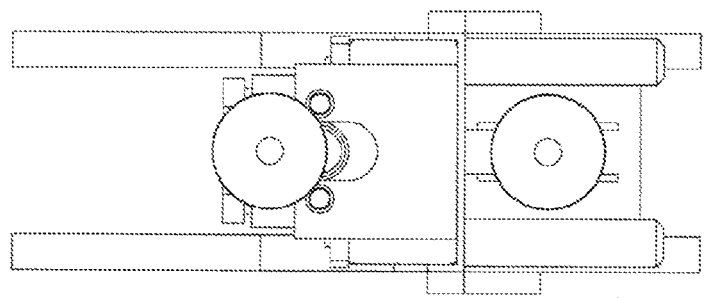
FIG. 14B is a top plan view of FIG. 14A.
Figure 14C:
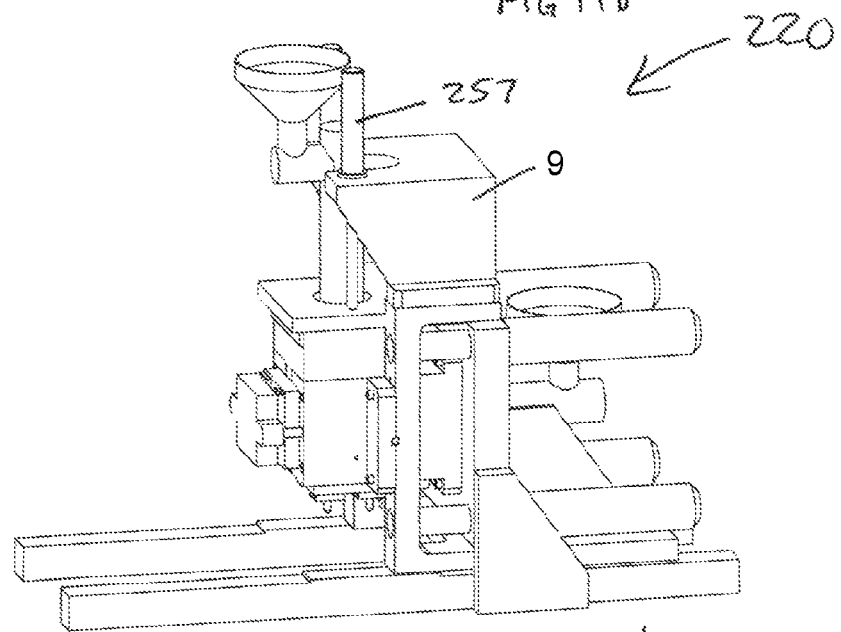
FIG. 14C is top perspective view of FIG. 14A.
Figure 15A:
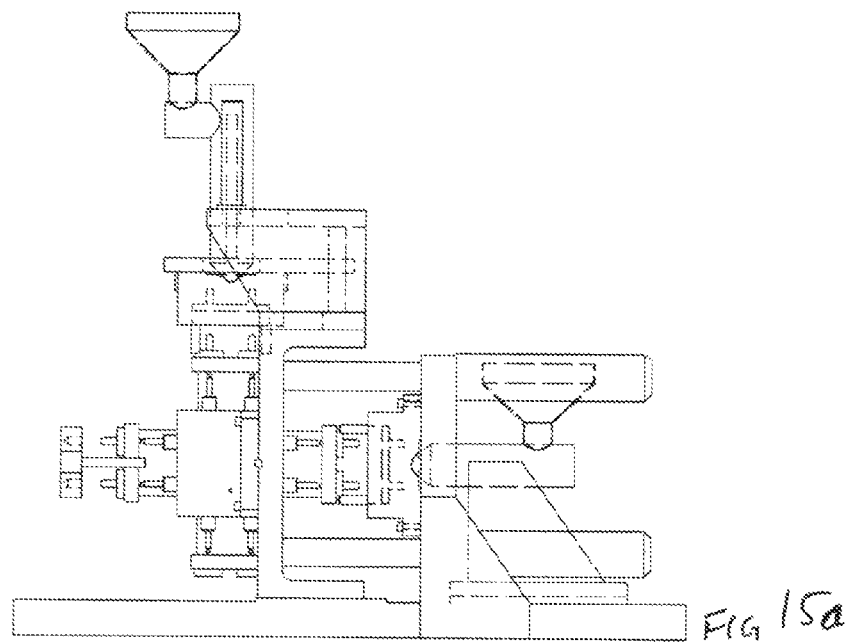
FIG. 15A is side view of the FIG. 14A apparatus in an alternative state of operation.
Figure 15B:
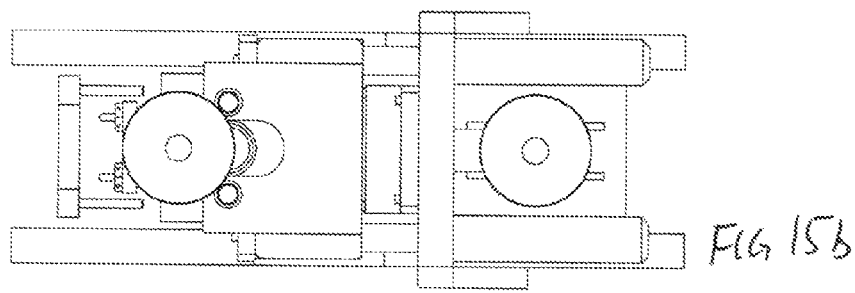
FIG. 15B is a top plan view of FIG. 15A.
Figure 15C:
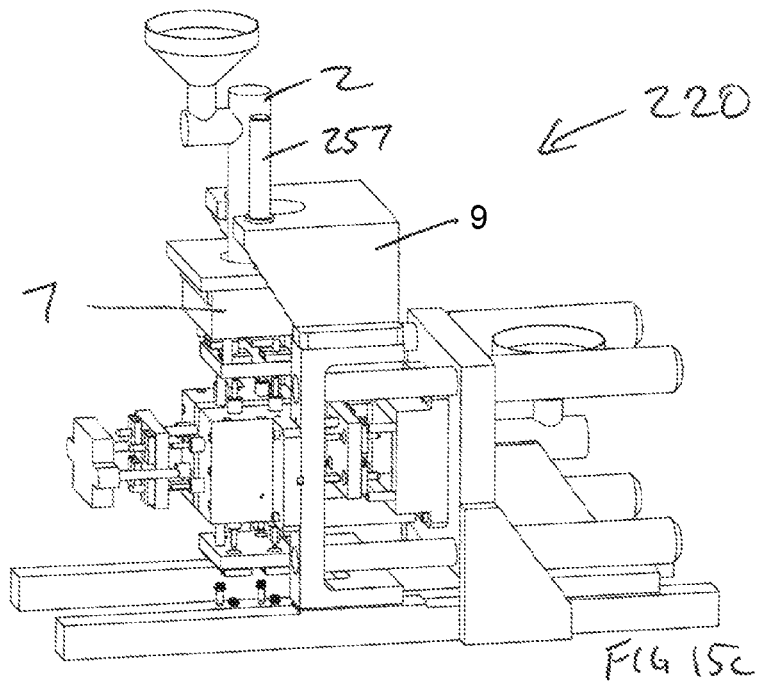
FIG. 15C is top perspective view of FIG. 15A.
Figure 17A:
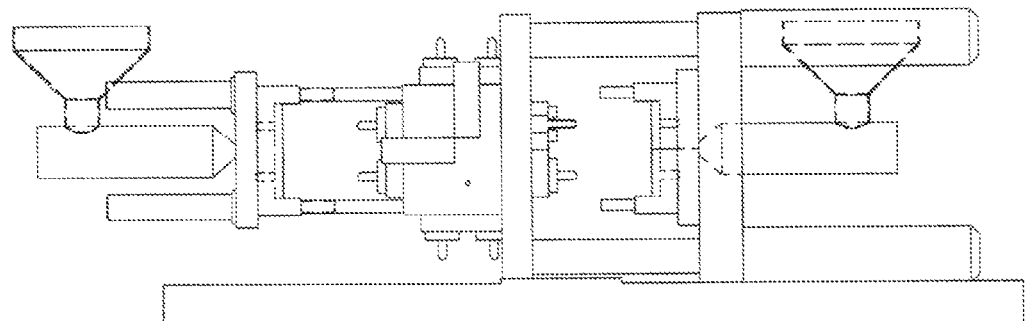
FIG. 17A is side view of another embodiment of the FIG. 1 apparatus.
Figure 17B:
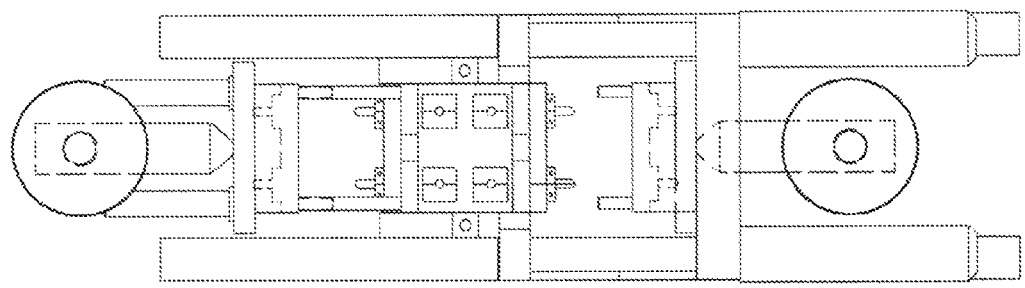
FIG. 17B is a top plan view of FIG. 17A.
Figure 17C:
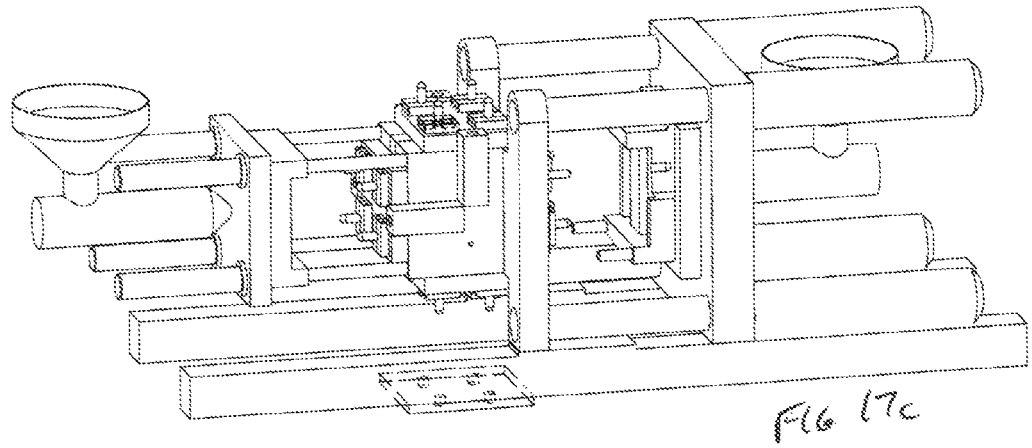
FIG. 17C is top perspective view of FIG. 17A.
Figure 18A:
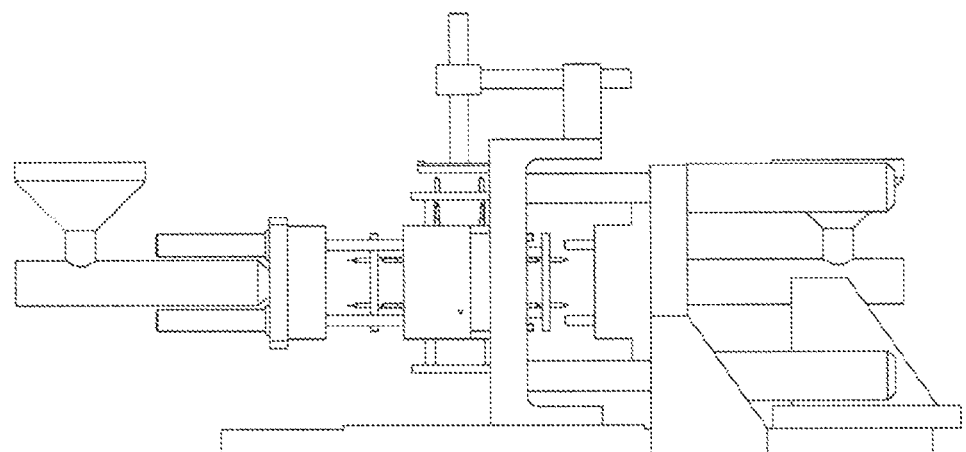
FIG. 18A is side view of another embodiment of the FIG. 1 apparatus.
Figure 18B:
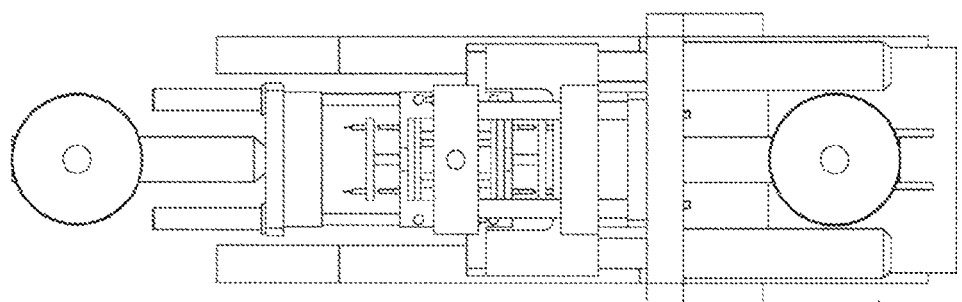
FIG. 18B is a top plan view of FIG. 18A.
Figure 18C:
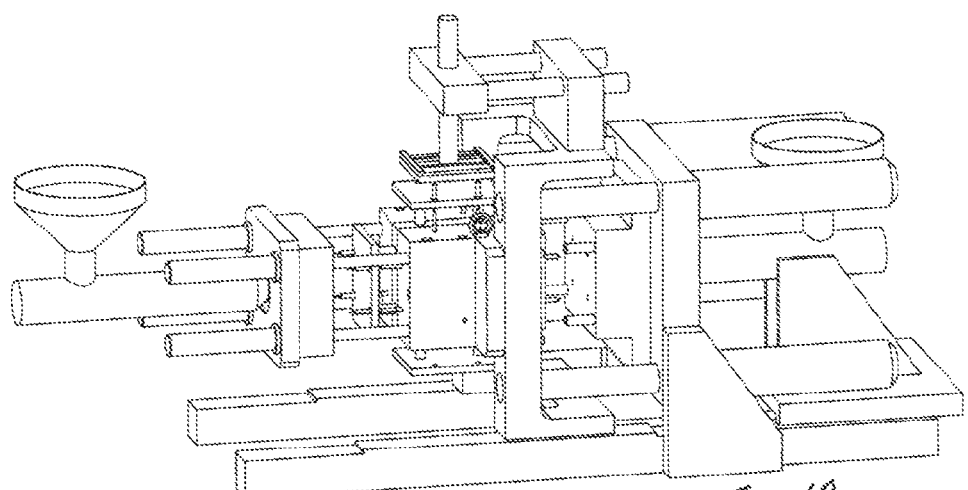
FIG. 18C is top perspective view of FIG. 18A.

A first locking mechanism is provided for selectively locking the position of each tie bar 13 and is shown at 70. The first locking mechanisms 70 are operable to apply a first clamping force between the movable machine frame 10 and the stationary machine platen 3 so as to inhibit leakage of the first molding material 51 from the first molding cavities 50 when the first molding cavities 50 are closed. The first locking mechanisms 70 may have any suitable structure. For example, as shown in FIGS. 11a-11c, the first locking mechanism 70 may include a locking member 72 that is positioned in the stationary machine platen 3 and has four toothed portions 74a spaced apart circumferentially by non-toothed portions 74b. The locking member 72 is rotatable between an unlocked position (FIG. 11c) in which the toothed portions 74a align with non-toothed portions 76b on the tie rods 13 thereby permitting extension and retraction of the tie rods 13, and a locked position (FIGS. 11a and 11b) in which the toothed portions 74a are aligned with and engage toothed portions 76a, thereby locking the position of the tie rods 13 relative to the stationary machine platen 3. The toothed portions 76a on the tie rods 13 are engageable with the toothed portions 74a on the locking members 72 when the movable machine frame 10 is in the closed position whereby the rotary handling unit mold cavity portions 58a, 58b, 58c or 58d engage the first mold plate 5, such that the first mold cavities 50 are closed.

A second locking mechanism is shown at 76 is provided for selectively locking the position of each tie bar 57c. The locking mechanisms 76 may be similar to the locking mechanisms 70.

In the example embodiment shown in FIGS. 1-10, the molded parts 25 are bottle preforms. The mold cavities 50 are formed by the first portions 50a which are cavity portions located in the first mold plate 5, rotary handling unit mold cavity portions 58a, 58b 58c or 58d, which are pairs of neck ring mold portion halves, and cores which are shown at 18a and are provided on the first side 64 of the carrier 6. Similarly, the second mold cavities 90 are formed by the first portions 90a which are cavity portions located in the second mold plate 7, rotary handling unit mold cavity portions 58a, 58b 58c or 58d, and cores 18b which are provided on the second side 66 of the carrier 6.

Figure 1:
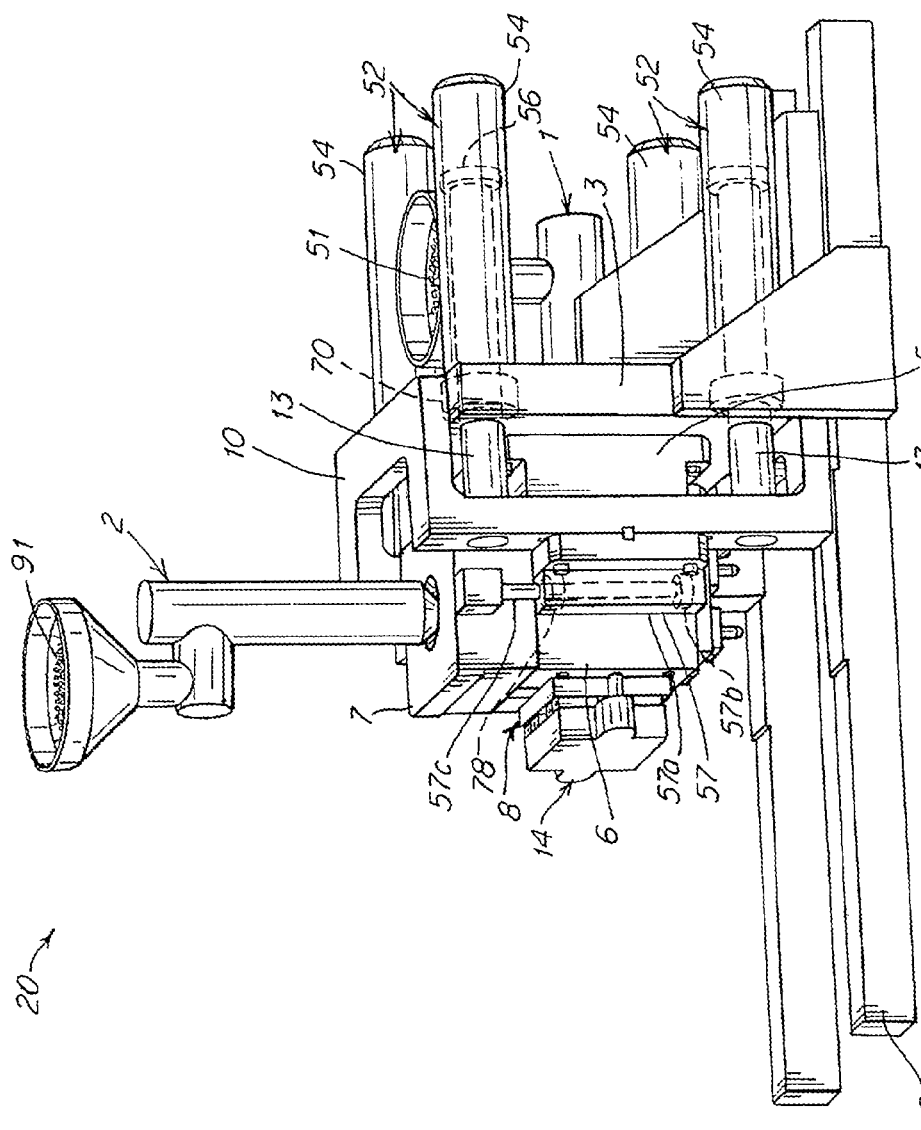
FIG. 1 perspective view of a multi shot injection molding apparatus in a closed position, FIG. 2 side view of apparatus according to FIG. 1, FIG. 3 top view of apparatus according to FIG. 1, FIG. 4 perspective view of the apparatus of FIG. 1 in an opened position, FIG. 5 side view of apparatus according to FIG. 4, FIG. 6 top view of apparatus according to FIG. 4, FIG. 7 perspective view of the apparatus of FIG. 1 in an intermediate position, FIG. 8 side view of apparatus according to FIG. 7, FIG. 9 top view of apparatus according to FIG. 7.
Figure 3:
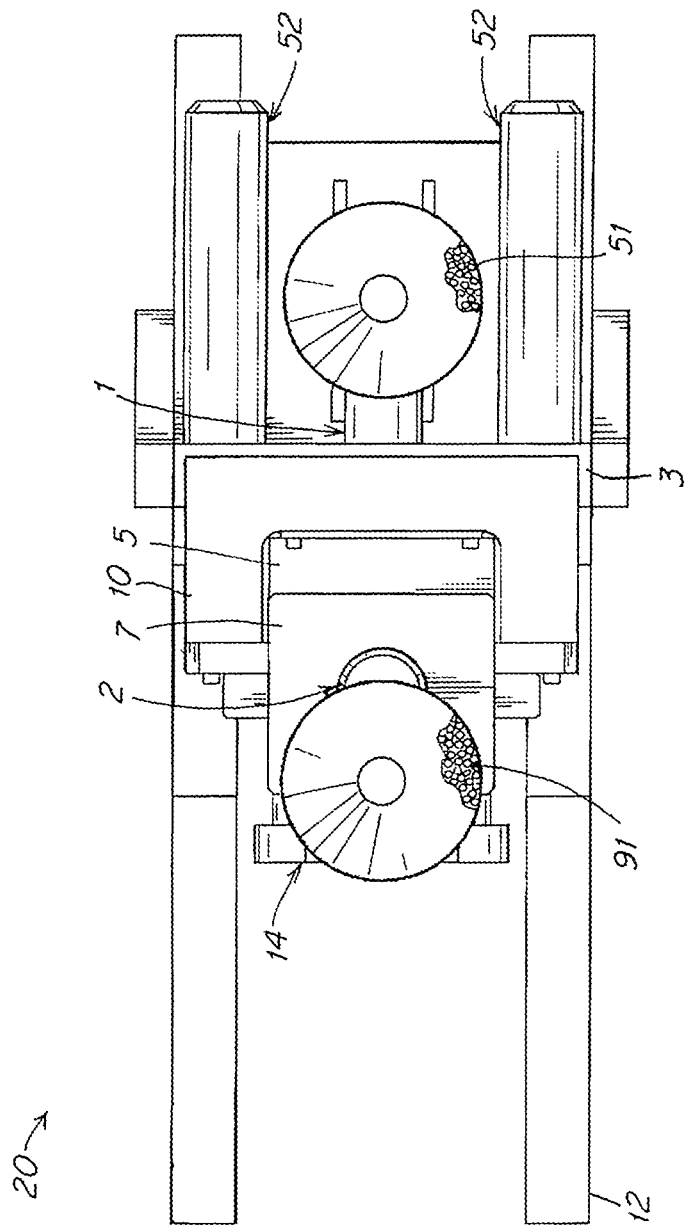
Figure 4:
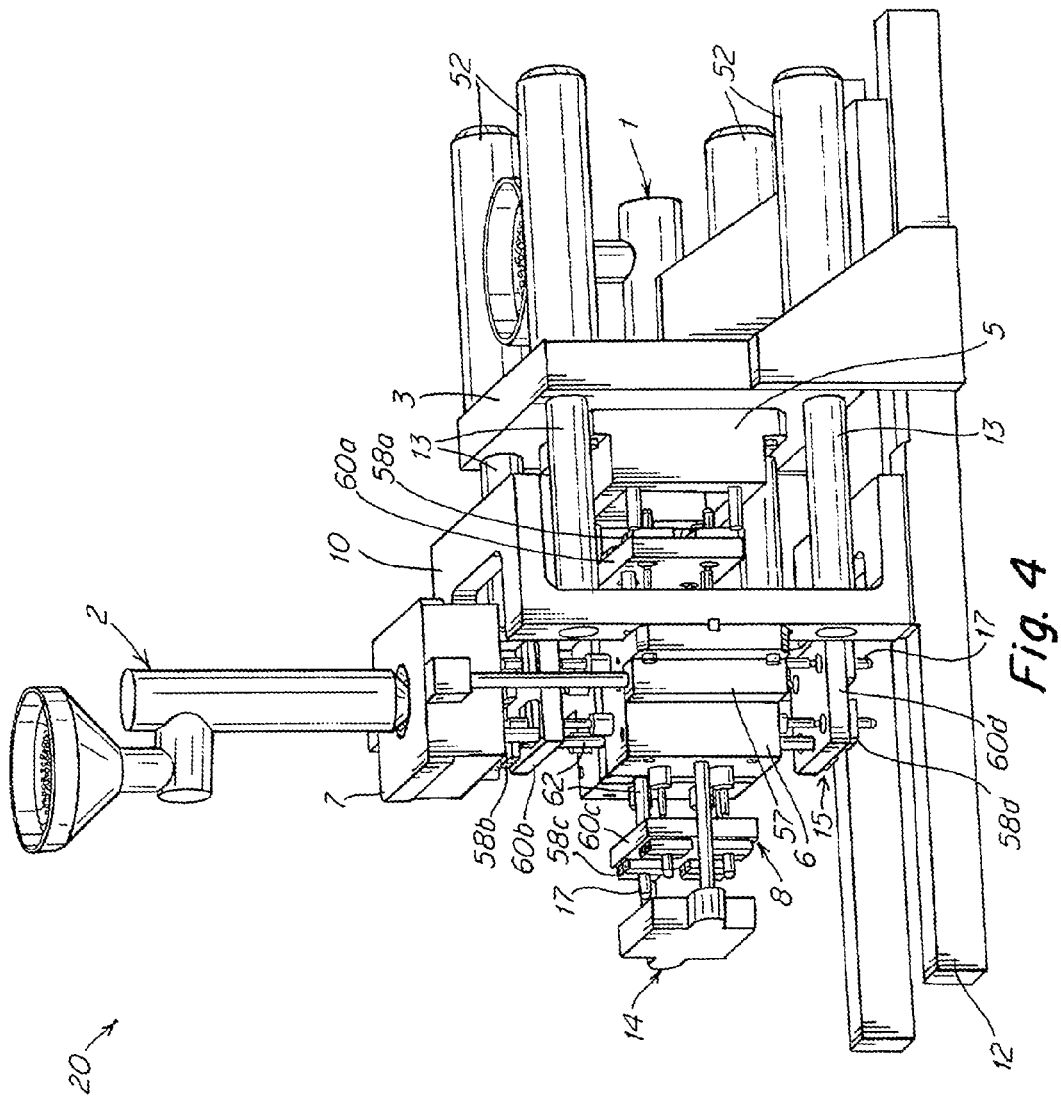
Figure 5:
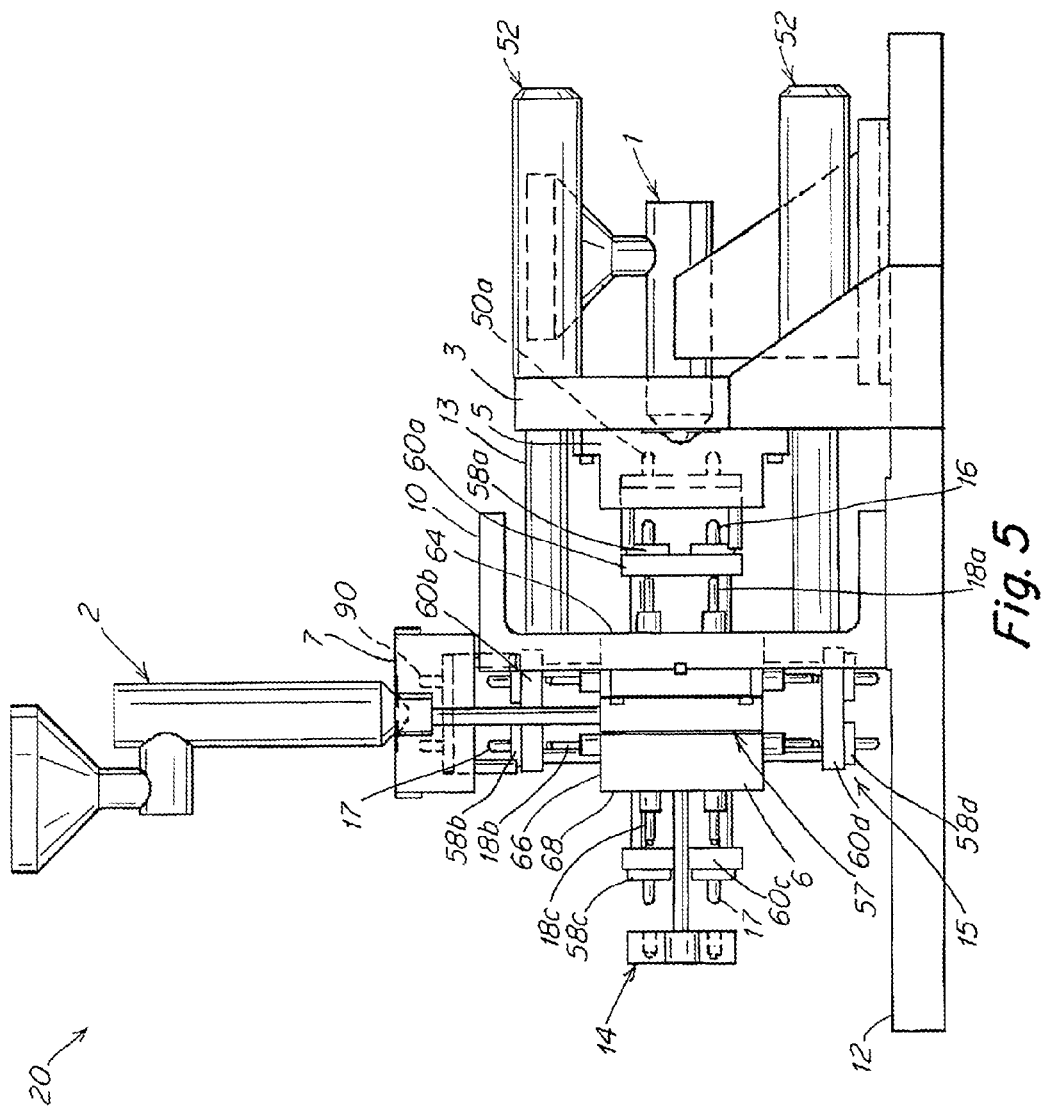
Figure 9:
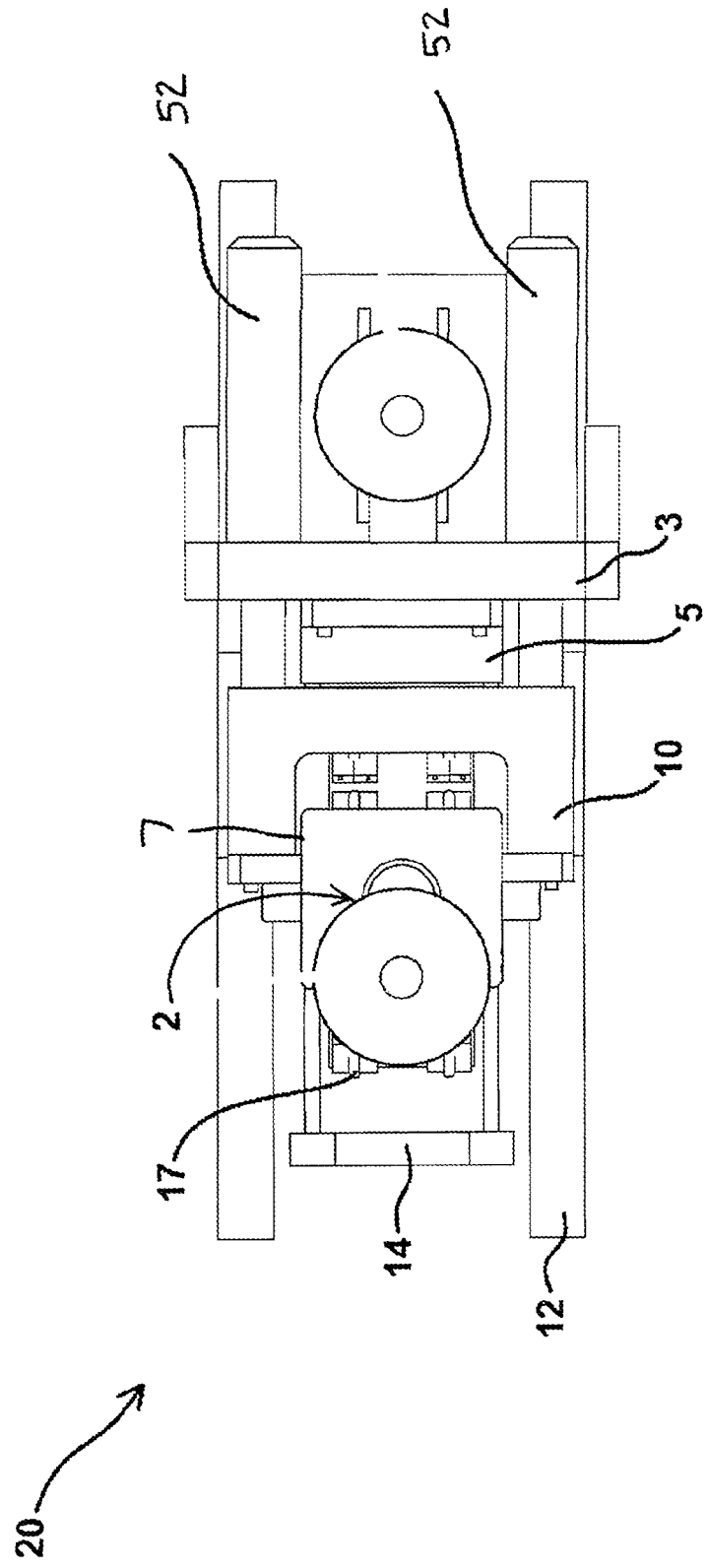
Figure 10:
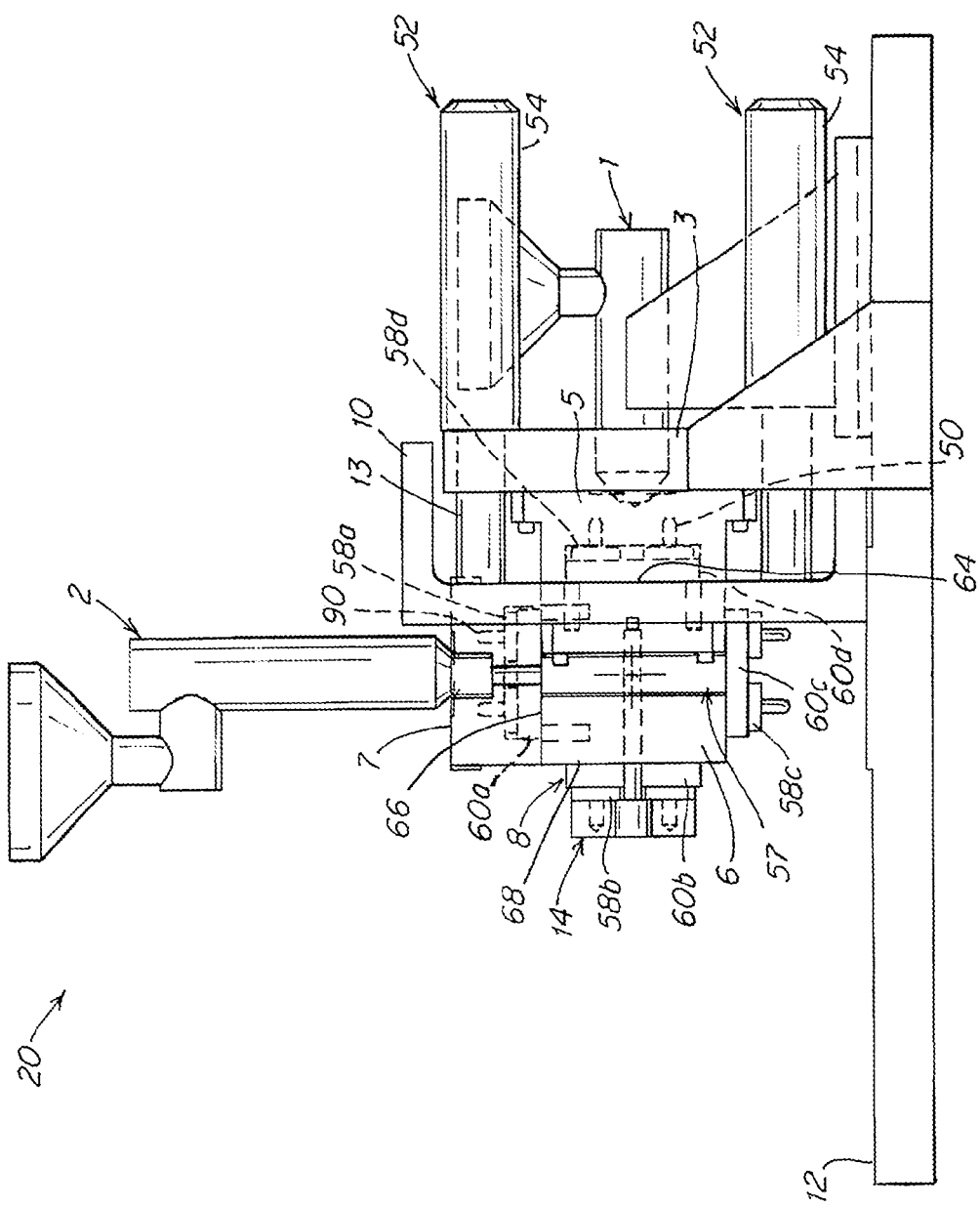
FIG. 10 is a view same as FIG. 2 in an alternative state.

During operation, the apparatus closes as in FIGS. 1-3, opens as in FIGS. 4-6. In FIGS. 7-9 the rotary handling unit 8 rotates to remove the first portions 16 from the first side 64 of the carrier 6 and move them to the second side 66 as shown in FIG. 10. At this point the apparatus closes again so that the second material can be injected into the second mold cavities. The apparatus 20 then opens again and the rotary handling unit 8 rotates the molded parts 25 to the processing station 14 where they may be processed (e.g. cooled). The apparatus then opens again and the rotary handling unit then rotates the parts 25 to the ejection station 15 where they are ejected. Each time the rotary handling unit 8 rotates and the apparatus closes again, new first material 51 is injected into the first cavities 50, new second material 91 is injected into the second cavities 90 a the same time, parts 25 are cooled in the processing station 14, and cooled parts 25 are ejected from the apparatus 20.

It will be understood, however, that, in some embodiments, the first and second mold cavities may be defined solely by cooperation between rotary handling unit mold cavity portions with first portions in the first mold plate or in the second mold plate, as the case may be. For example, as shown in FIGS. 12a-13d, an injection molding apparatus 120 is provided and which has first mold cavities shown at 150 which are defined by first portions 150a in the first mold plate 5, and rotary handling unit mold cavity portions 158a, 158b, 158c or 158d on the rotary handling unit 8. The second mold cavities are shown at 190 and are defined by first portions 190a in the second mold plate 7 and the rotary handling unit mold cavity portions 158a, 158b, 158c or 158d.

In the apparatuses 20 and 120 the second mold plate 7 and the second injection unit 2 are mounted directly to the carrier 6 via the rams 57. In an alternative embodiment of an injection molding apparatus 220 shown in FIGS. 14a-15c, the second mold plate 7 and the second injection unit 2 are mounted via rams 257 to the movable machine frame 10 via a support bracket 9.

In the apparatuses 20, 120 and 220, the second side 66 of the carrier 6 (i.e. the side on which the second injection unit 2 is positioned) is positioned at 90 degrees from the first side 64 of the carrier 6. This permits an advantageous construction for the apparatuses 20, 120 and 220 in that it permits easy removal of the carrier 6 and its attendant components such as the rotary handling unit 8 for replacement for example with a different one. This is achieved by providing a withdrawal space 99 that is on the third side 68 of the carrier 6 and by providing an open side on the movable machine frame 10. In this way, the carrier 6 can be disconnected from the movable frame 10 and withdrawn therefrom into the withdrawal space 99.

However, in an alternative embodiment, the carrier 6 may have the second side 66 be positioned at 180 degrees from the first side 64 of the carrier 6, as shown in FIGS. 17a-18c. In the embodiment shown in FIGS. 17a-18c, a processing station (e.g. a cooling station) is provided on the third side 68 of the carrier 6 which is between the first and second side 64 and 66.

Other stations can be added such a in-mold label station between these stations. Because carrier 6 is attached to machine frame 10 and because the clamping unit of apparatus 20 is located along the first injection unit 1, there is ample space behind carrier 6 to do additional molding or post molding operations. Because the $2^{nd}$ injection unit is movable and coupled to the carrier 6 many molded parts can be manufactured using different materials in injection units 1 and 2 or the same material (for example to reduce the cooling time and the cycle time when thick parts need to be molded of a single material. Because carrier 6 is not rotatable the transfer of molded parts between the stations is done by the rotary handling unit 8.

FIGS. 16a-16c show a fourth embodiment in which preforms are made on a unit where the second injection unit is supported on a support bracket 9 on the movable machine frame 10.

REFERENCE NUMBERS OF SOME ELEMENTS 1 first injection unit
2 second injection unit
3 stationary platen
4 clamping cylinder
5 mold cavity plate of the first mold cavity
6 carrier
7 mold cavity plate of the second mold cavity
8 rotary handling unit
10 frame
12 base
13 tie bar
14 cooling station
15 ejection station
16 first portion of molded parts
17 second portion of molded parts
18 first injection core
19 cooling core
20 multi-shot injection molding apparatus
23 cooling cavity
25 molded part

The invention claimed is:

1. A multi shot injection molding apparatus for forming a plurality of molded parts, comprising:
    a stationary machine platen;
    a first mold plate that is secured to the stationary machine platen;
    a first injection unit secured to the stationary machine platen and sealingly connected to the first mold plate for delivering a first molding material to a plurality of first molding cavities, wherein a first portion of each of the first molding cavities is located on the first mold plate, wherein the first molding cavities are configured to form first portions of the molded parts;
    a movable machine frame that is movable along a first linear direction line relative to the stationary machine platen;
    a carrier that does not rotate, that does not itself contain mold cavities, and that is coupled to the movable machine frame for movement along the first linear direction line so as to open and close the first molding cavities;
    a second mold plate positioned in association with the movable machine frame;
    a second injection unit for delivering a second molding material to a plurality of second molding cavities, wherein a first portion of each of the second molding cavities is located on the second mold plate, wherein the second molding cavities are configured to form second portions of the molded parts, wherein the second injection unit and the second mold plate are movable together relative to the carrier during the opening and closing of the second mold cavities;
    a rotary handling unit coupled to the carrier and movable with the carrier, and having a first plurality of rotary handling unit mold cavity portions thereon and a second plurality of rotary handling unit mold cavity portions thereon,
        wherein the rotary handling unit is positionable in a first position in which the first plurality of rotary handling unit mold cavity portions are on a first side of the carrier and cooperate with the first mold plate to at least partially define the first mold cavities and the second plurality of rotary handling unit mold cavity portions are on a second side of the carrier and cooperate with the second mold plate to at least partially define the second mold cavities,
        and wherein the rotary handling unit is configured to remove the first portions of the molded parts from the first side of the carrier and is movable to a second position in which the first plurality of rotary handling unit mold cavity portions are on the second side of the carrier and cooperate with the second mold plate to at least partially define the second mold cavities
    wherein the coupled carrier and rotary handling unit are configured to be disconnected and removed together from the movable machine frame.

2. A multi shot injection molding apparatus as claimed in claim 1, wherein the second side of the carrier is positioned at 90 degrees from the first side of the carrier.

3. A multi shot injection molding apparatus as claimed in claim 1, wherein the second side of the carrier is positioned at 180 degrees from the first side of the carrier.

4. A multi shot injection molding apparatus as claimed in claim 1, wherein the stationary machine platen and the movable machine frame are movably connected together via a plurality of first mold plate rams.

5. A multi shot injection molding apparatus as claimed in claim 4, wherein the second mold plate and second injection unit are movably connected together to the carrier via a plurality of second mold plate rams.

6. A multi shot injection molding apparatus as claimed in claim 5, wherein the second mold plate rams extend between the carrier and the second mold plate.

7. A multi shot injection molding apparatus as claimed in claim 5, wherein the second mold plate rams extend between the movable machine frame and the second mold plate.

8. A multi shot injection molding apparatus as claimed in claim 5, wherein the carrier has a third side that is opposite the first side, and wherein the injection molding apparatus includes a withdrawal space adjacent the third side of the carrier, wherein the movable machine frame has a generally open side and wherein the withdrawal space is sufficiently large to permit withdrawal of the carrier from said generally open side of the movable machine frame into the withdrawal space.

9. A multi shot injection molding apparatus as claimed in claim 5, wherein the rotary handling unit includes a plurality of rotary handling unit mold cavity portions, wherein the rotary handling unit mold cavity portions are cooperable with the first and second portions of the first mold cavities to entirely define the first mold cavities, and are cooperable with the first and second portions of the second mold cavities to entirely define the second mold cavities.

10. The multi shot injection molding apparatus of claim 1, wherein the second injection unit is sealingly connected to the second mold plate.

11. The multi shot injection molding apparatus of claim 1, further comprising a first locking mechanism configured to apply a first clamping force between the movable machine frame and the stationary machine platen so as to inhibit leakage of the first molding material from the first molding cavities.

12. The multi shot injection molding apparatus of claim 11, further comprising a second locking mechanism configured to apply a second clamping force between the second mold plate and the carrier so as to inhibit leakage of the second molding material from the second molding cavities.

13. The multi shot injection molding apparatus of claim 1, further comprising a processing station and an ejection station for ejecting the molded parts, wherein the processing station and the ejection station are coupled to the carrier and are movable relative to the carrier.

14. The multi shot injection molding apparatus of claim 1, wherein the movable machine frame further comprises a support bracket configured to support the second injection unit.

* * * * *